Aug. 10, 1926.
C. L. RICKENBRODE
1,595,869
BASKET
Filed July 7, 1925
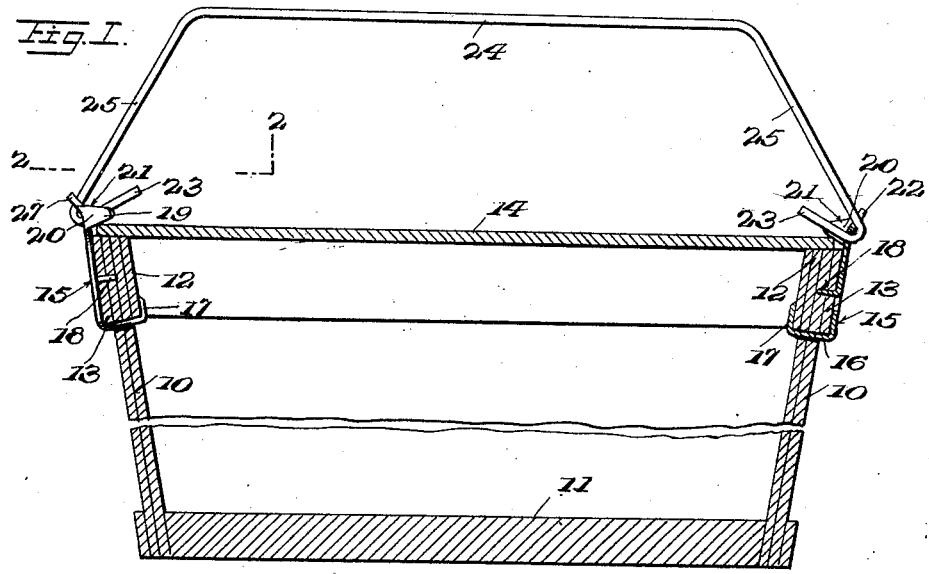
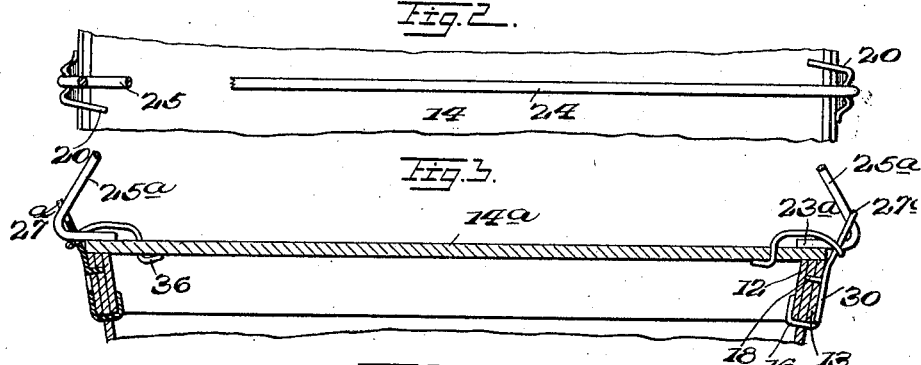
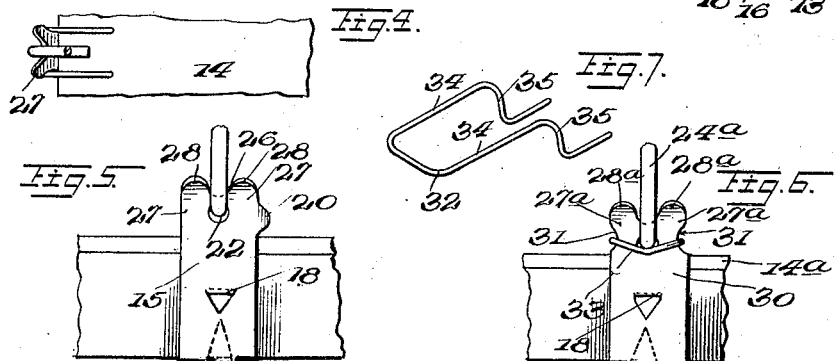
WITNESSES
H. T. Walker
Harry P. Seidel
INVENTOR
C. L. RICKENBRODE
BY
ATTORNEYS Patented Aug. 10, 1926.

1,595,869

UNITED STATES PATENT OFFICE.

CHARLES LAWRENCE RICKENBRODE, OF RIPLEY, NEW YORK.

BASKET.

Application filed July 7, 1925. Serial No. 42,038.

This invention relates to baskets, and more particularly to brackets for securing handles to said baskets.

An object of the invention is the provision of a device for removably attaching handles to a basket and for aiding in securing the cover of the basket in operative position.

Another object of the invention is the provision of a simple and efficient device for removably attaching wire handles to a basket so that the handles may be locked in an operative position or in an inoperative position and in flat engagement with the cover of the basket so that the handles will not interfere with an economical packing when the baskets are being shipped.

A further object of the invention is the provision of a clip adapted to be used in cooperation with a handle attaching bracket for securing a cover to the basket in such a manner that all possibility of detachment of the cover is eliminated.

A still further object of the invention is the provision of a bracket for removably attaching a handle to a basket and for permitting locking of the handle in a plurality of different positions, the bracket being provided with cooperating spaced fingers for receiving the edges of the cover to retain the cover in position.

This invention will be best understood from a consideration of the following detailed description in view of the accompanying drawing forming a part of this specification; nevertheless it is to be understood that the invention is not confined to the disclosure, being susceptible of such changes and modifications which shall define no material departure from the salient features of the invention as expressed in the appended claims.

Figure 1 is a transverse vertical section of a basket showing my improved brackets applied, Figure 2 is a horizontal section taken along the line 2—2 of Figure 1, Figure 3 is a transverse vertical section of a basket disclosing a modification of the bracket in Figure 1 with a cover clip attached, Figure 4 is a horizontal section of the construction shown in Figure 3, Figure 5 is a side view in elevation of the bracket disclosed in Figure 1, Figure 6 is a side view in elevation of the bracket and clip of Figure 3, Figure 7 is a view in perspective of the clip employed in combination with the modified form of bracket shown in Figure 3.

The brackets and clip are adapted to be more particularly employed in connection with the so-called slat baskets formed of a veneer of wood but it will be appreciated that they may be applied to baskets constructed of metal or some form of composition board.

The basket as shown has inclined sides 10 secured to a bottom 11. The open end of the basket adjacent the periphery of the upper ends of the sides is provided with inner and outer reinforcing straps 12 and 13 secured to the side walls in the usual manner. A cover 14 is applied to the opening in a manner which will be presently explained.

Brackets 15 are secured to the side walls by means of a sharp pointed lug 16 forced through the side wall in embracing relation with the lower edges of the straps 12 and 13 and bent at its free end 17 in flat engagement with the inner surface of the strap 12 for a portion of the width of said strap. A second lug 18 is punched from the body of the bracket and pressed into the strap 13 and side wall 10.

Adjacent the upper end of the brackets and projecting inwardly from a side edge, is a finger 20 adapted to engage an edge of the cover 14 when said cover has been forced into position and thereby clamp the cover against displacement. The lower edge 19 of the finger 20 is inclined upwardly to provide a binding action on an edge of the cover. The upper edge 21 of finger 20 is curved downwardly to facilitate the insertion of the cover.

The upper end of each bracket 15 is provided with a perforation 22 which is slightly elevated above the outer horizontal surface of the cover to receive an angularly bent end 23 of a wire handle 24. The end 23 is bent at an acute angle to the inclined legs 25 of the U-shaped handle, so that the ends will not only engage the edges of the cover but will be in a position to freely move when the handle is placed in a horizontal or inoperative position.

The lower ends of the legs 25 of the handle are received in a U-shaped notch 26 formed between a pair of outwardly curved ears 27. These ears are rounded as shown at 28 to permit the lower end of the legs of the handle, when engaged between the ears, to ride over said ears and snap into place behind the curved portions of the ears whereby the handle is locked in an inoperative position.

After the brackets have been secured into position at opposite sides of the basket and the cover has been applied to the top, the legs of the handle are spread apart and the ends 23 are inserted into the perforations 22. The lower ends of the legs are engaged between the ears 27 and held in an erect position.

If it be desired to lower the handle it is only necessary to force the handle to one side of its vertical position when the lower ends of the legs will ride over the rounded ends of the ears and snap back of the curved portion of said ears. This locks the handle in flat engagement with the cover 14.

In the modified form shown in Figures 3, 4 and 6, the brackets 30 have the attaching lugs 16 and 18 of the type disclosed in Figure 1. The curved ears 27ª are provided with rounded ends 28ª and notches 31. The cover 14ª seats directly on the upper edges of the straps 12, and 13 and the wall 10.

In order to secure the cover 14ª in position a U-shaped clip is provided which has a V-shaped bridge portion 33 engaging around the ears 27ª with the legs 34 received by the notches 31. The legs are bent downwardly at 35, and forced through perforations in the cover. The free ends 36 of the legs are bent upwardly into close contact with the inner face of the cover.

The free ends 23ª of the handle 24ª lie in flat engagement with the cover and between the legs 34 of the clip 32. The handle is sprung into a vertical position between the ears 27ª and into a horizontal position over the rounded portions 28ª of the ears. The handle is locked in the last mentioned position by the curved portions of said ears.

The brackets are stamped from metal sheets, and the ears, lugs and fingers are bent simultaneously to position.

What I claim is:

1. Attaching brackets for U-shaped basket handles comprising metal plates having rearwardly curved ears at the upper end thereof, said ears being spaced to form a notch to receive the legs of the handle, securing lugs projecting inwardly from the plates, said plates being provided with a perforation to receive a free end of the handle.

2. Attaching brackets for U-shaped basket handles comprising metal plates having rearwardly curved ears at the upper end thereof, said ears being spaced to form a notch to receive the legs of the handle, securing means for the plates, said plates being provided with a perforation to receive a free end of the handle, and a finger extending inwardly from the plate to engage an edge of the cover of the basket.

3. Attaching brackets for U-shaped basket handles comprising metal plates having rearwardly curved ears at the upper end thereof, said ears being spaced to form a notch to receive the legs of the handle, securing means for the plates, said plates being provided with a perforation to receive a free end of the handle, said ears being rounded at their outer ends to permit the legs of the handle to ride over the ears and dispose said handle in a horizontal position.

4. Attaching brackets for U-shaped basket handles comprising metal plates having means for securing a handle thereto, securing lugs projecting inwardly from the plates, said plates being provided with a perforation to receive a free end of the handle, and a finger extending inwardly from the plate to engage an edge of the cover of the basket, said finger having an edge inclined to form a flaring mouth between said finger and top of the basket so that the finger will clamp the cover to the basket.

5. Attaching brackets for U-shaped basket handles comprising metal plates having rearwardly curved ears at the upper end thereof, said ears being spaced to form a notch to receive the legs of the handle, means for securing the plates to the basket, said plates being provided with a perforation to receive a free end of the handle, and a finger extending inwardly from the plate to engage an edge of the cover of the basket and clamp the cover to the basket.

6. Attaching brackets for U-shaped basket handles comprising metal plates having rearwardly curved ears at the upper end thereof, said ears being spaced to form a notch to receive the legs of the handle, securing lugs projecting inwardly from the plates, said plates being provided with a perforation to receive a free end of the handle, the curving of the ears forming seats to receive portions of the handles and aiding in locking the handle in a horizontal position.

7. Attaching brackets for U-shaped basket handles comprising metal plates having rearwardly curved ears at the upper end thereof, said ears being spaced to form a notch to receive the legs of the handle, securing lugs projecting inwardly from the plates, said handles having the free ends bent inwardly, the plate being provided with a perforation to receive a bent portion of the handle.

CHARLES LAWRENCE RICKENBRODE.